(12) United States Patent
Joyce et al.

(10) Patent No.: US 11,846,304 B1
(45) Date of Patent: Dec. 19, 2023

(54) INDUCER TUNNEL MAGNETIZATION

(71) Applicant: Blue Origin, LLC, Kent, WA (US)

(72) Inventors: Christopher Michael Joyce, Seattle, WA (US); Saleh Tyzoon Tyebjee, Seattle, WA (US); Ivan Victorovich Klimov, Kent, WA (US); Zachary Daniel Rizzolo, Renton, WA (US)

(73) Assignee: Blue Origin, LLC, Kent, WA (US)

( * ) Notice: Subject to any disclaimer, the term of this patent is extended or adjusted under 35 U.S.C. 154(b) by 0 days.

(21) Appl. No.: 17/823,882

(22) Filed: Aug. 31, 2022

(51) Int. Cl.
*F04D 7/00* (2006.01)
*F04D 29/40* (2006.01)

(52) U.S. Cl.
CPC .............. *F04D 7/00* (2013.01); *F04D 29/406* (2013.01)

(58) Field of Classification Search
CPC ........... F04D 7/00; F04D 29/40; F04D 29/406
See application file for complete search history.

(56) References Cited

U.S. PATENT DOCUMENTS

| | | | | |
|---|---|---|---|---|
| 4,171,615 A | * | 10/1979 | Stewart | F02K 9/46 376/318 |
| 10,557,462 B2 | * | 2/2020 | Bessho | C09K 5/048 |
| 2021/0309334 A1 | * | 10/2021 | Benini | B63H 23/24 |

FOREIGN PATENT DOCUMENTS

JP     H04331454 A  * 11/1992

OTHER PUBLICATIONS

Machine translation of JP H04331,454, Tagawa et al., published Nov. 19, 1992 (Year: 1992).*
Christopher Immer, Max Kandulla, John Lane, Robert Youngquist, Magnetocalorie Pumping of Liquid Oxygen, NASA Technical Briefs, Feb. 2004, https://ntrs.nasa.gov/archive/nasa/casi.ntrs.nasa.gov/20110016742.pdf.
https://en.wikipedia.org/wiki/Curie%27s_law.
https://en.wikipedia.org/wiki/Curie_constant.
Romero-Calvo, A., Akay, Ö., Schaub, H et al. Magnetic phase separation in microgravity. npj Microgravity 8, 32 (2022). https://doi.org/10.1038/s41526-022-00212-9.

* cited by examiner

*Primary Examiner* — Juan G Flores
*Assistant Examiner* — Jason G Davis
(74) *Attorney, Agent, or Firm* — Summit Patents, PC

(57) ABSTRACT

A high pressure engine propulsion system, such as a rocket engine, having improved engine performance is described herein. A liquid propellant, such as liquid oxygen, is paramagnetic. Cavitation bubbles of the liquid propellant can form in an inducer tunnel of a turbopump when the pressure in the turbopump inlet drops below the vapor pressure of the liquid propellant. The turbopump includes a magnetic field source external to the inducer tunnel to generate or provide a steady magnetic field across or through the inducer tunnel. The steady magnetic field interacts with the paramagnetic propellant, thereby reducing or eliminating cavitation bubble growth, causing cavitation bubbles to collapse, retaining cavitation bubbles within the inducer tunnel, the like, or combinations thereof.

28 Claims, 4 Drawing Sheets

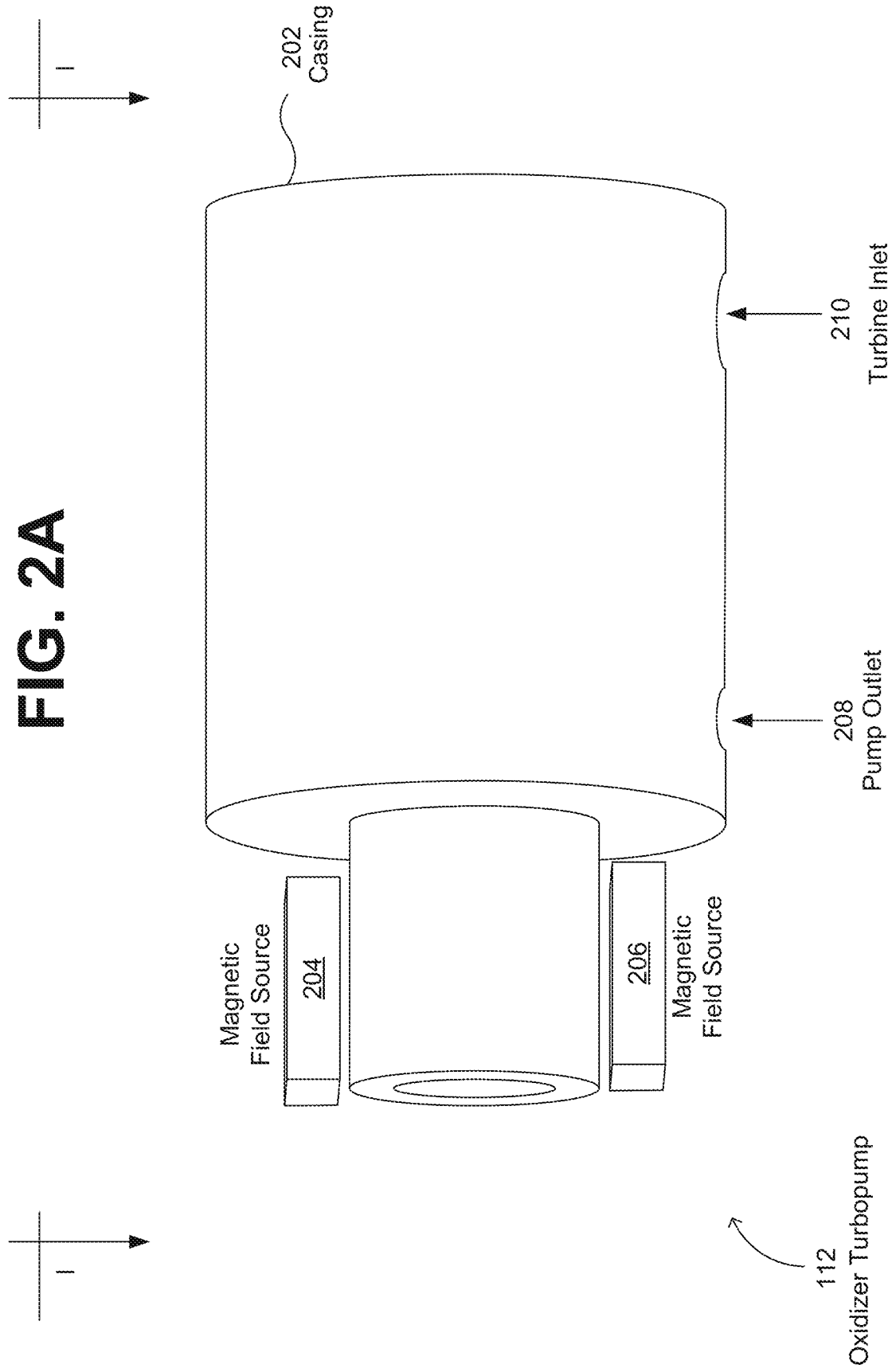

INDUCER TUNNEL MAGNETIZATION

BACKGROUND

Propulsion systems, such as those used in rockets or other high pressure engine applications, use liquid propellants. In a rocket engine, for example, the liquid propellant is pumped from one or more propellant tanks into a combustion chamber via a turbopump driven by a gas turbine.

Aerospace and rocket designers focus on minimizing overall structural mass of the rocket and especially focus on minimizing mass of the propellant tank(s) to optimize the rocket's performance. One particular focus for them is to keep the propellant tank wall as thin as possible. Turbopump designers then need to limit the turbopump rotational speed to avoid cavitation within the propellant because the thinner tank wall may be more susceptible to cavitation (e.g., cavitation bubbles that form within or flow to the propellant tank), the structural integrity of tank wall may only be maintained up to a given pressure, or both. The limited rotation speed of the turbopump, however, restricts performance and increases turbopump mass. Therefore, turbopump speeds, and the associated efficiencies, are generally limited by suction performance. Cavitation occurs when the pressure in the pump inlet drops below the vapor pressure of the liquid propellant. Vapor bubbles form at the pump inlet and travel towards the pump outlet. The bubbles collapse as they travel towards the pump outlet and release heat, a shockwave, or both. The bubble collapse causes damage, such as pitting, to the internal turbopump components. Cavitation can also reduce turbopump performance, cause the flow rate to fluctuate, reduce discharge pressure, or the like.

The art would benefit from a pumping system that has a working fluid with paramagnetic properties that improves engine performance without increasing mass or causing other vehicle operational inefficiencies.

BRIEF DESCRIPTION OF THE DRAWINGS

FIG. 2A illustrates a portion of an example turbopump.

DETAILED DESCRIPTION

Figure 1:
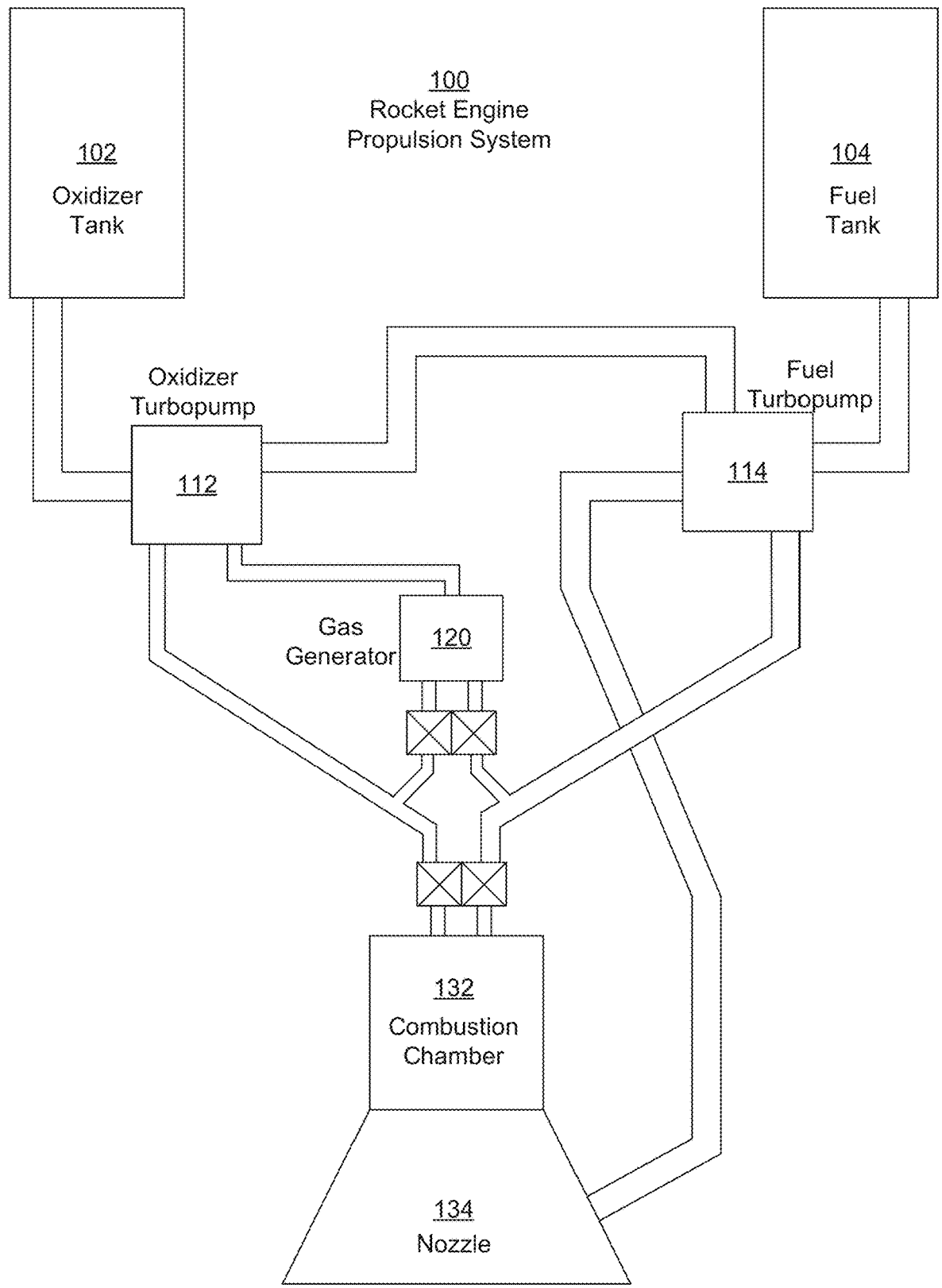
FIG. 1 illustrates a block diagram of an example high pressure engine propulsion system.

A high pressure engine propulsion system using a working fluid with paramagnetic properties and having improved engine performance is described herein. Propulsion systems typically include a turbopump to produce a high-pressure fluid from a low-pressure fluid. The high-pressure fluid is paramagnetic and is fed to a combustion chamber to undergo combustion that creates the thrust force that propels the rocket to move. One example application is a rocket engine using a paramagnetic propellant or other working fluid.

It is typically desirable to operate a turbopump at the highest speed possible, subject to cavitation. However, the speed of the turbopump cannot increase indefinitely because formation of cavitation bubbles limit its functional performance. The new systems and methods disclosed herein have a turbopump that can spin faster without reducing suction performance because the turbopump design reduces cavitation bubbles produced during turbopump operation. Suction performance is the ability of the turbopump to move the propellant from the low pressure pump inlet into the impeller and to the combustion chamber, whether by increasing the amount of propellant in the combustion chamber, the pressure of the propellant when moved into the combustion chamber, or both. Improved suction performance can improve thrust, and therefore engine performance and efficiency, by increasing the amount of propellant within the combustion chamber, the pressure of the propellant within the combustion chamber, or both. In effect, the speed limitation typically associated with turbopumps is reduced or eliminated in this newly disclosed design, which improves engine performance and efficiency and reduces engine mass. The system also provides for lower propellant tank pressure, lower vehicle structural mass, or both.

The turbopump of the disclosed high pressure engine propulsion system includes an inducer tunnel with an inducer in or proximal to the inducer tunnel to reduce the required net positive suction head (NPSH) of the turbopump. The inducer reduces the required NPSH by increasing static pressure upstream of an impeller of the turbopump, such as at a pump inlet, within the inducer tunnel 212, or at an end of the inducer tunnel proximal to the inducer. Required NPSH is the difference between the total pressure head available at the pump inlet, and the vapor pressure head of the propellant, required for the pump to operate without deterioration in pump performance or reduced discharge pressure head caused by cavitation bubbles forming in the propellant. The turbopump also includes a magnetic field source to the inducer tunnel to generate or provide a magnetic field (e.g., a steady magnetic field) across or through the inducer tunnel. In one example, the magnetic field source can be external to the inducer tunnel. In another example, the magnetic field source can be internal to the inducer tunnel. In yet another example, the magnetic field source can be embedded within a wall of the inducer tunnel.

The steady magnetic field interacts with the paramagnetic propellant creating a local area in the propellant flow higher in static pressure than the surrounding field. The local higher pressure region interacts with the vaporizing propellant (i.e., the volume of propellant next to the surface of the bubble, the gaseous molecules or atoms that form the bubble, the like, or combinations or multiples thereof), thereby reducing or eliminating cavitation bubble growth, causing cavitation bubbles to collapse, retaining cavitation bubbles within the inducer tunnel, the like, or combinations thereof. The interaction of the steady magnetic field on the cavitation bubbles includes the manner or way in which the steady magnetic field acts on the cavitation bubbles, such as forces exerted by the steady magnetic field on the cavitation bubbles (i.e., the volume of propellant next to the surface of the bubble, the gaseous molecules or atoms that form the bubble, the like, or combinations or multiples thereof).

The turbopump can be used in a propulsion system for a rocket, whether or not the rocket is in low or ultra-low gravity.

FIG. 1 shows an example rocket engine propulsion system 100, which is one embodiment of the disclosed high pressure engine systems. The rocket engine propulsion system 100 generates thrust by expelling exhaust generated by combusting one or more propellant(s). Though the rocket engine propulsion system 100 is discussed herein as being bipropellant (i.e., using two propellants), the systems, components, and methods can likewise be applied to a monopropellant engine or a tripropellant engine.

The rocket engine propulsion system 100 includes an oxidizer tank 102 to store an oxidizer (i.e., a first liquid propellant) and a fuel tank 104 to store a fuel (i.e., a second liquid propellant).

The oxidizer can be paramagnetic, such as liquid oxygen. The fuel can be liquid hydrogen.

The oxidizer is fed to a combustion chamber 132 via an oxidizer turbopump 112.

The rocket engine propulsion system 100 also includes a fuel turbopump 114 to feed the fuel to the combustion chamber 132. In one example, the fuel turbopump 114 is identical to the oxidizer turbopump 112. In another example, the fuel turbopump 114 is similar to the oxidizer turbopump 112, but does not include the magnetic field source.

The combustion chamber 132 is a vessel that receives the two liquid propellants of a bipropellant engine (e.g., oxidizer and fuel) and in which the two liquid propellants undergo combustion to produce exhaust. The exhaust is passed through a nozzle 134 to increase exhaust flow and produce thrust.

The rocket engine propulsion system 100 also includes a gas generator 120 that produces high-pressure gas or steam used to power a turbine of a rotor of the oxidizer turbopump 112. The high-pressure gas or steam drives the turbine of the rotor, which causes the entire rotor to spin or rotate. The gas can be generated by burning some of the liquid propellant within the gas generator 120. The high-pressure gas or steam can also be used to power a turbine of a rotor of the fuel turbopump 114 in some examples.

Figure 2B:
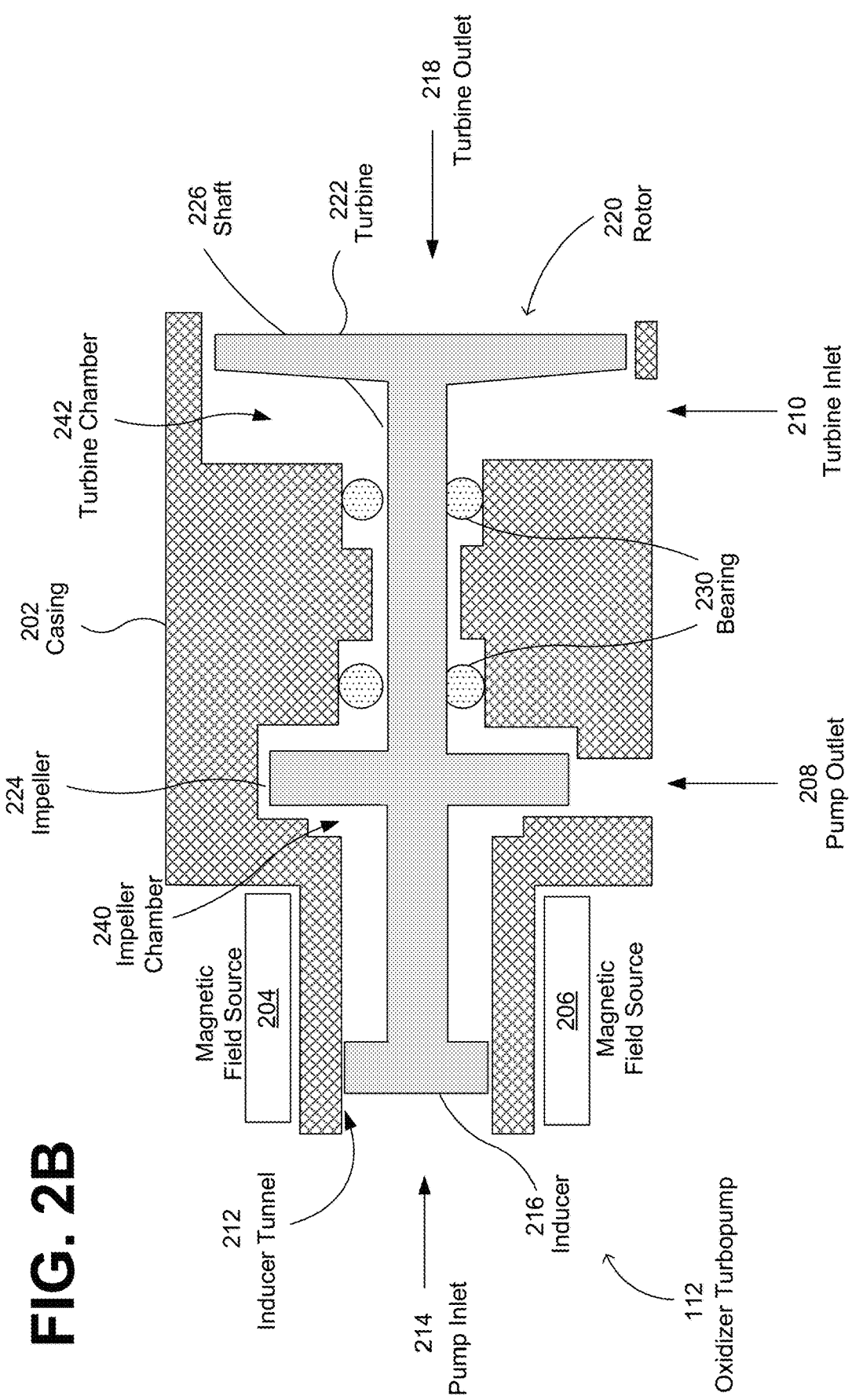
FIG. 2B illustrates a cross-section of the example turbopump shown in FIG. 2A.

FIG. 2A shows the oxidizer turbopump 112. FIG. 2B shows a cross-sectional view of the oxidizer turbopump 112 along the line I-I. The oxidizer turbopump 112 includes a casing 202, an inducer tunnel 212, a magnetic field source 204, 206, and a rotor 220.

The rotor 220 includes an inducer 216, an impeller 224, and a turbine 222. The inducer 216, the impeller 224, and the turbine 222 are adjoined by a shaft 226. The shaft 226 can be formed from a single piece or multiple pieces. For example, a single piece shaft extends from the inducer 216 through the impeller 224 and to the turbine 222. As another example, a multiple piece shaft includes a first piece extending from the inducer 216 to the impeller and a second piece extending from the impeller 224 to the turbine 222.

The inducer 216 reduces the required NPSH by increasing static pressure upstream of the impeller 224, such as at the pump inlet 214, within the inducer tunnel 212, or at an end of the inducer tunnel 212 proximal to the inducer 216. The impeller 224 transfers energy, such as that of the rotor 220, to the liquid propellant to increase the pressure and flow of the liquid propellant. The turbine 222 converts energy provided by gas (or steam, where appropriate) into mechanical energy via rotation of the shaft 226 to cause the inducer 216 and the impeller 224 to rotate. For example, a gas generator produces a high-pressure gas or steam used to power the turbine 222. The high-pressure gas or steam drives the turbine 222 of the rotor 220, which causes the entire rotor 220 to spin or rotate. The gas generator can be in fluid communication with the turbine 222 via tubing, piping, or the like.

The casing 202 houses, protects, and provides structure for other components of the oxidizer turbopump 112. The casing 202 includes the pump inlet 214 in fluid communication with a pump outlet 208 via an impeller chamber 240. The pump inlet 214 can be a hole or opening to receive the oxidizer from the oxidizer tank 102. The pump outlet 208 can be a hole, opening, or channel from which the oxidizer expelled and directed to the combustion chamber 132. The impeller chamber 240 is a space or cavity within the casing 202 being sized and shaped to house the impeller 224.

The casing 202 also includes a turbine inlet 210 in fluid communication with a turbine outlet 218 via a turbine chamber 242. The turbine inlet 210 can be a hole, opening, or channel to receive gas to cause the turbine 222 to spin. The turbine outlet 218 can be a hole, opening, or channel from which the gas that turns the turbine 222 is expelled. The turbine chamber 242 is a space or cavity within the casing 202 that is sized and shaped to house the turbine 222.

The oxidizer turbopump 112 also includes bearings 230 to constrain axial or translation motion, while permitting rotation of the rotor 220 and reducing friction between the rotor 220 and another component, including the casing 202.

Figure 3:
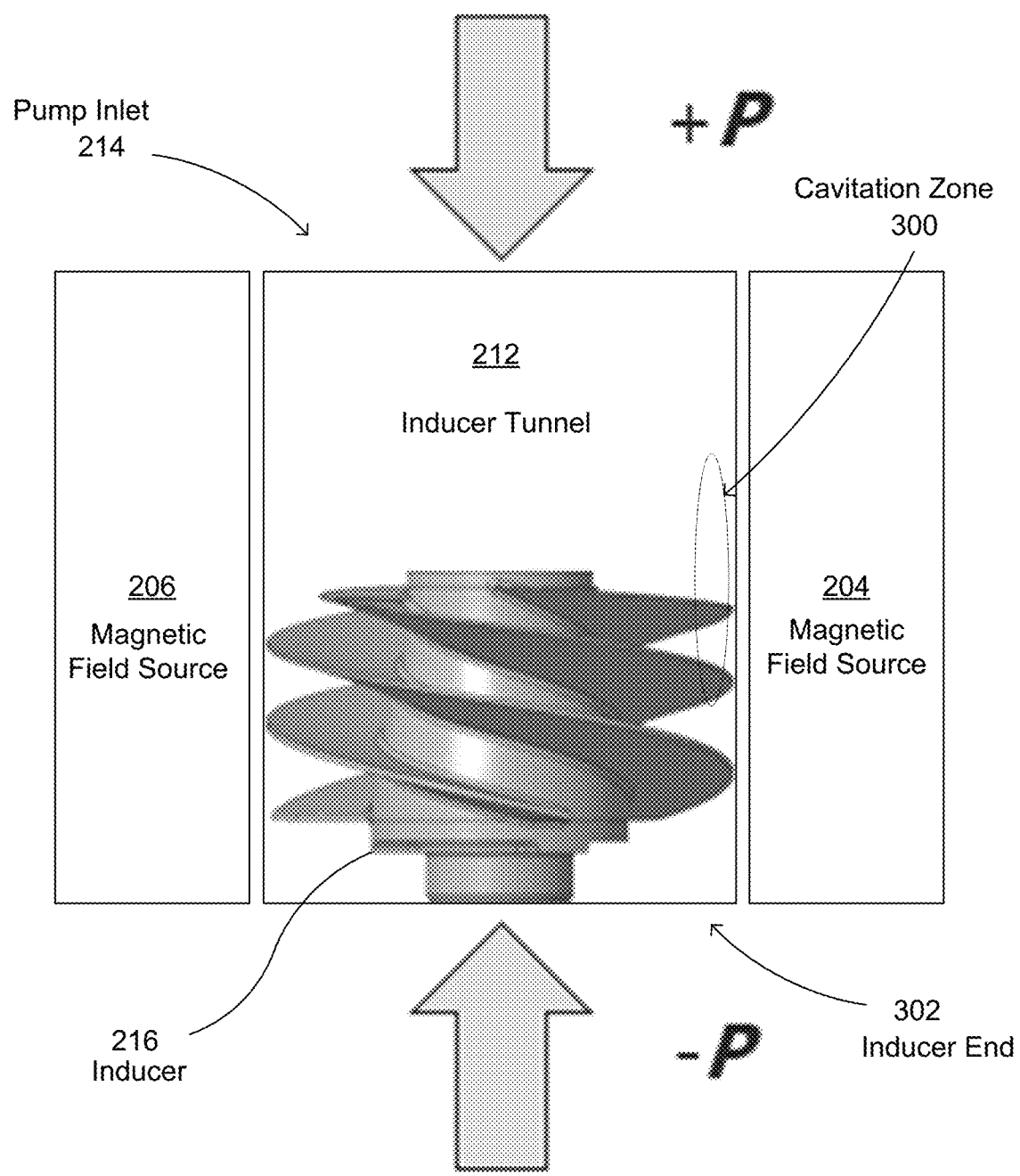
FIG. 3 illustrates a block diagram of an inducer tunnel of an example turbopump.

The pump inlet 214 is in fluid communication with the impeller chamber 240 via an inducer tunnel 212. FIG. 3 shows a cavitation zone 300 including the inducer tunnel 212. The inducer tunnel 212 includes two open ends, the pump inlet 214 and an inducer end 302. The inducer tunnel 212 also includes the inducer 216 at the inducer end 302.

Cavitation occurs when the pressure in the pump inlet 214 drops below the vapor pressure of the liquid propellant. A force exerted on the liquid propellant (e.g., liquid oxygen, or LOx) draws the liquid propellant towards the area of strong magnetic field, thereby increasing the absolute pressure at the center of inducer tunnel 212. However, a pressure rise (+P) at the pump inlet 214 caused by the magnetic force can be traded for a pressure loss (−P) at the inducer end 302 because cavitation is driven by absolute pressure at a leading edge of the inducer 216. This trade in pressures is permissible because a head rise over the length of the inducer 216 can prevent cavitation at the inducer end 302. Therefore, any cavitation occurs between the pump inlet 214 and a tip or blade of the inducer 216 proximal to the pump inlet 214. Even if cavitation occurs, the cavitation bubbles can be retained within the inducer tunnel 212, the amount of cavitation can be reduced or eliminated, or the cavitation bubbles can be collapsed due to the interaction of the magnetic field and the cavitation bubbles being filled with a gaseous form of a paramagnetic atom or molecule(s) like $O_2$.

The cavitation zone 300 also includes a magnetic field source external 204, 206 to the inducer tunnel 212 and located between the pump inlet 214 and the inducer end 302. In one example, the magnetic field source includes first and second magnets 204, 206 on opposing sides of the inducer tunnel 212. The first and second magnets 204, 206 can be permanent magnets or electromagnets. In another example, the magnetic field source is an electromagnet that encircles or wraps around the inducer tunnel 212.

The magnetic field source generates or provides a steady magnetic field across the inducer tunnel 212 (i.e., perpendicular to an axis extending from the pump inlet 214 to the inducer end 302), through the inducer tunnel 212 (i.e., parallel to the axis extending from the pump inlet 214 to the inducer end 302), or oblique relative to the inducer tunnel 212 (i.e., at an angle that is neither parallel nor perpendicular to the axis extending from the pump inlet 214 to the inducer end 302).

In one example, the magnetic field can inhibit cavitation bubble formation interaction between the steady magnetic field and the cavitation bubbles because the liquid propellant in this case is paramagnetic. The electromagnetic force exerted by the steady magnetic field creates a local higher pressure region. Within this higher pressure region, the volume of propellant next to the bubble surface exerts a collapsing force on the bubble. The speed of formation and size of the cavitation bubbles can therefore be reduced, as compared to a system without a steady magnetic field. In another example, the magnetic field can cause cavitation bubble collapse due to the interaction between the steady magnetic field and the cavitation bubbles being paramagnetic. The magnetic field can cause the cavitation bubble to form with an irregular shape. This irregular shape can cause the cavitation bubble to collapse due to the instability of forces exerted on the irregular shape of the cavitation bubble (i.e., by the pressure within the cavitation bubble, by the pressure exerted by the liquid next to the bubble surface, or both), whether during formation or once formation is complete. In yet another example, the magnetic field can attract and retain cavitation bubbles within the inducer tunnel 212 due to the interaction between the steady magnetic field and the cavitation bubbles being paramagnetic.

Accordingly, reducing or eliminating cavitation, collapsing cavitation bubbles, retaining cavitation bubbles within the inducer tunnel 212, the like, or combinations thereof allows the inducer 216 to be run at a higher rotational speed. The higher rotational speed of the inducer increases the efficiency of the turbopump and thus the overall engine efficiency and performance. Alternatively, to higher speeds, pumps can be run at lower inlet pressures reducing the tank pressure and wall thickness.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents.

What is claimed is:

1. A pumping system that has a working fluid with paramagnetic properties, the pumping system comprising:
   an inducer tunnel;
   an inducer in the inducer tunnel; and
   a magnetic field source adjacent to the inducer and external to the inducer tunnel, the magnetic field source providing a steady magnetic field to the inducer and to the inducer tunnel to interact with cavitation bubbles of a first propellant that is paramagnetic.

2. The pumping system of claim 1, wherein the magnetic field source is an electromagnet.

3. The pumping system of claim 1, wherein the magnetic field source includes a permanent magnet.

4. The pumping system of claim 1, wherein the magnetic field source is two permanent magnets on opposing sides of the inducer and the inducer tunnel.

5. The pumping system of claim 1, wherein the magnetic field source is two electromagnets on opposing sides of the inducer and the inducer tunnel.

6. The pumping system of claim 1, wherein the steady magnetic field is located across the inducer and the inducer tunnel so as to inhibit cavitation bubble formation by an interaction between the steady magnetic field and a volume of the paramagnetic first propellant next to a surface of one or more of the cavitation bubbles.

7. The pumping system of claim 1, wherein the steady magnetic field is located across the inducer and the inducer tunnel so as to reduce cavitation bubble size by an interaction between the steady magnetic field and a volume of the paramagnetic first propellant next to a surface of one or more of the cavitation bubbles.

8. The pumping system of claim 1, wherein the steady magnetic field is located across the inducer and the inducer tunnel so as to attract and retain the cavitation bubbles within the inducer tunnel by an interaction between the steady magnetic field and a volume of the paramagnetic first propellant next to a surface of one or more of the cavitation bubbles.

9. The pumping system of claim 1, wherein the first propellant is an oxidizer.

10. The pumping system of claim 9, wherein the oxidizer is liquid oxygen.

11. The pumping system of claim 1, wherein the magnetic field source is located adjacent to the inducer, which is adjacent to a pump inlet of the inducer tunnel.

12. The pumping system of claim 1, wherein the steady magnetic field is provided across the inducer and across the inducer tunnel.

13. The pumping system of claim 1, wherein the steady magnetic field is provided along a longitudinal axis of the inducer tunnel.

14. The pumping system of claim 1, wherein the steady magnetic field is provided obliquely relative to a longitudinal axis of the inducer tunnel.

15. The pumping system of claim 1, further comprising a second propellant to undergo combustion with the first propellant to generate thrust.

16. The pumping system of claim 15, wherein the second propellant is a liquid fuel.

17. The pumping system of claim 16, wherein the liquid fuel is liquid hydrogen.

18. A method for reducing or eliminating cavitation in a pumping system for a paramagnetic working fluid, the method comprising:
   providing an inducer within an inducer tunnel that includes a pump inlet and an inducer end;
   causing the inducer to rotate;
   causing a steady magnetic field to be applied to the inducer and the inducer tunnel;
   causing the paramagnetic working fluid to flow past the rotating inducer; and
   creating a net positive suction head to be available at the pump inlet.

19. The method of claim 18, further comprising generating gas in a gas generator to cause a turbine to rotate, the gas generator being in fluid communication with the turbine which is adjoined to the inducer.

20. The method of claim 18, further comprising generating the steady magnetic field by a magnetic field source that includes one or more electromagnets, a permanent magnet, two permanent magnets on opposing sides of the inducer and the inducer tunnel, or two electromagnets on opposing sides of the inducer and the inducer tunnel.

21. The method of claim 20, wherein the magnetic field source is located between the pump inlet of the inducer tunnel and the inducer end of the inducer tunnel.

22. The method of claim 18, further comprising inhibiting cavitation bubble formation by an interaction between the steady magnetic field and a volume of the paramagnetic working fluid next to a surface of one or more of the cavitation bubbles.

23. The method of claim 18, further comprising reducing cavitation bubble size by an interaction between the steady magnetic field and a volume of the paramagnetic working fluid next to a surface of one or more of the cavitation bubbles.

24. The method of claim 18, further comprising attracting and retaining cavitation bubbles within the inducer tunnel by an interaction between the steady magnetic field and a volume of the paramagnetic working fluid next to a surface of one or more of the cavitation bubbles.

25. The method of claim 18, further comprising applying the steady magnetic field across the inducer tunnel.

26. The method of claim 18, further comprising causing the paramagnetic working fluid to combust with a propellant within a combustion chamber to generate exhaust.

27. The method of claim 26, further comprising directing the exhaust through a nozzle to cause the exhaust to generate thrust.

28. The method of claim 18, further comprising causing the paramagnetic working fluid to flow past the rotating inducer to a combustion chamber.

\* \* \* \* \*